(12) United States Patent
Stewart et al.

(10) Patent No.: US 9,360,236 B2
(45) Date of Patent: Jun. 7, 2016

(54) THERMAL ENERGY SYSTEM AND METHOD OF OPERATION

(75) Inventors: James J. Stewart, Prins Hendriklaan (NL); Dmitriy I. Zaynulin, London (GB); Grahame Newton, De Zilk (NL)

(73) Assignee: GREENFIELD MASTER IPCO LIMITED, St. Helier, NJ (US)

( * ) Notice: Subject to any disclaimer, the term of this patent is extended or adjusted under 35 U.S.C. 154(b) by 900 days.

(21) Appl. No.: 12/999,608

(22) PCT Filed: Jun. 15, 2009

(86) PCT No.: PCT/EP2009/057379
§ 371 (c)(1),
(2), (4) Date: Apr. 6, 2011

(87) PCT Pub. No.: WO2010/003764
PCT Pub. Date: Jan. 14, 2010

(65) Prior Publication Data
US 2011/0197599 A1 Aug. 18, 2011

(30) Foreign Application Priority Data
Jun. 16, 2008 (GB) .................................. 0811013.2

(51) Int. Cl.
F25B 30/06 (2006.01)
F24J 3/08 (2006.01)
F03G 7/04 (2006.01)

(52) U.S. Cl.
CPC . *F24J 3/081* (2013.01); *F03G 7/04* (2013.01); *F25B 30/06* (2013.01); *F25B 2339/047* (2013.01); *F25B 2400/22* (2013.01); *Y02B 10/40* (2013.01); *Y02E 10/12* (2013.01)

(58) Field of Classification Search
CPC . F25B 30/06; F25B 2313/002; F28D 20/0052
USPC .............................................. 62/260; 165/45
See application file for complete search history.

(56) References Cited

U.S. PATENT DOCUMENTS 2,461,449 A * 2/1949 Smith et al. ..................... 62/260
2,637,531 A   5/1953 Davidson
(Continued)

FOREIGN PATENT DOCUMENTS

CH          649623       5/1985
CN      1 731 041 B     2/2006
(Continued)

OTHER PUBLICATIONS

International Search Report and Written Opinion of the International Searching Authority for PCT/EP2012/054044, entitled: Thermal Energy System and Method of Operation, date of mailing Jan. 17, 2013.
(Continued)

*Primary Examiner* — Ljiljana Ciric
*Assistant Examiner* — Alexis Cox
(74) *Attorney, Agent, or Firm* — Hamilton, Brook, Smith & Reynolds, P.C.

(57) ABSTRACT

A thermal energy system includes a first thermal energy system, a closed loop geothermal energy system, an intermediate heat pump thermally coupling the first thermal energy system with the geothermal energy system, and a second thermal energy system thermally connected to the geothermal energy system. The first and second thermal energy systems have opposite net thermal energy demands from the geothermal system. The geothermal energy system has first and second groups of borehole heat exchangers and each borehole heat exchanger contains a working fluid. Each borehole heat exchanger includes an elongated tube having a closed bottom end and first and second adjacent elongated conduits interconnected at the bottom end. Each group of borehole heat exchanger is selectively and alternatively connectable to the intermediate heat pump. The first thermal energy system may be a refrigeration system having condensers and the closed loop geothermal energy system may provide cooling of the condensers.

14 Claims, 5 Drawing Sheets

(56) References Cited

U.S. PATENT DOCUMENTS

| | | | |
|---|---|---|---|
| 3,168,337 A | 2/1965 | Johnson et al. | |
| 3,986,362 A | 10/1976 | Baciu | |
| 4,022,025 A | 5/1977 | Greene | |
| 4,044,830 A | 8/1977 | Van Huisen | |
| 4,062,489 A | 12/1977 | Henderson | |
| 4,134,462 A | 1/1979 | Clay | |
| 4,165,619 A * | 8/1979 | Girard | 62/99 |
| 4,392,531 A | 7/1983 | Ippolito | |
| 4,538,673 A * | 9/1985 | Partin et al. | 165/45 |
| 4,657,076 A | 4/1987 | Tsutsumi et al. | |
| 4,693,089 A | 9/1987 | Bourne et al. | |
| 4,711,094 A | 12/1987 | Ares et al. | |
| 5,224,357 A | 7/1993 | Galiyano et al. | |
| 5,244,037 A * | 9/1993 | Warnke | 165/104.31 |
| 5,339,890 A | 8/1994 | Rawlings | |
| 5,372,016 A | 12/1994 | Rawlings | |
| 5,390,748 A | 2/1995 | Goldman | |
| 5,394,950 A | 3/1995 | Gardes | |
| 5,477,703 A | 12/1995 | Hanchar et al. | |
| 5,477,914 A | 12/1995 | Rawlings | |
| 5,477,915 A | 12/1995 | Park | |
| 5,495,723 A | 3/1996 | MacDonald | |
| 5,548,957 A | 8/1996 | Salemie | |
| 5,704,656 A | 1/1998 | Rowe | |
| 5,822,990 A * | 10/1998 | Kalina et al. | 60/649 |
| 5,875,644 A | 3/1999 | Ambs et al. | |
| 5,992,507 A | 11/1999 | Peterson et al. | |
| 6,158,466 A | 12/2000 | Riefler | |
| 6,220,339 B1 | 4/2001 | Krecke | |
| 6,250,371 B1 | 6/2001 | Amerman et al. | |
| 6,688,129 B2 | 2/2004 | Ace | |
| 6,775,996 B2 | 8/2004 | Cowans | |
| 6,848,506 B1 | 2/2005 | Sharp et al. | |
| 7,028,478 B2 | 4/2006 | Prentice, III | |
| 7,178,337 B2 | 2/2007 | Pflanz | |
| 7,264,067 B2 | 9/2007 | Glaser et al. | |
| 7,407,003 B2 | 8/2008 | Ross | |
| 7,571,762 B2 | 8/2009 | Ross | |
| 7,647,773 B1 | 1/2010 | Koenig et al. | |
| 2003/0024685 A1 * | 2/2003 | Ace | F24F 5/0046 165/45 |
| 2003/0221436 A1 | 12/2003 | Xu | |
| 2004/0206085 A1 | 10/2004 | Koenig et al. | |
| 2005/0006049 A1 * | 1/2005 | Ross | F24J 3/081 165/45 |
| 2005/0061472 A1 | 3/2005 | Guynn et al. | |
| 2006/0064281 A1 | 3/2006 | Nagano et al. | |
| 2006/0101820 A1 | 5/2006 | Koenig et al. | |
| 2006/0168979 A1 * | 8/2006 | Kattner | F25B 25/005 62/260 |
| 2007/0044494 A1 * | 3/2007 | Ally et al. | 62/260 |
| 2009/0084518 A1 | 4/2009 | Panula et al. | |
| 2010/0288465 A1 | 11/2010 | Stewart et al. | |
| 2011/0100586 A1 * | 5/2011 | Yang | F24J 3/086 165/45 |
| 2011/0146317 A1 * | 6/2011 | Cline et al. | 62/238.7 |
| 2012/0090807 A1 | 4/2012 | Stewart et al. | |
| 2013/0037236 A1 * | 2/2013 | Saunier | F24D 3/18 165/45 |
| 2014/0150475 A1 | 6/2014 | Zaynulin et al. | |
| 2014/0299291 A1 | 10/2014 | Stewart et al. | |

FOREIGN PATENT DOCUMENTS

| | | |
|---|---|---|
| CN | 1854649 A | 11/2006 |
| DE | 27 31 178 A1 | 1/1979 |
| DE | 2850865 | 6/1980 |
| DE | 29 19 855 A1 | 11/1980 |
| DE | 3018337 | 11/1980 |
| DE | 8032916 | 12/1980 |
| DE | 29 28 893 A1 | 1/1981 |
| DE | 30 09 572 A1 | 9/1981 |
| DE | 3048870 | 7/1982 |
| DE | 3114262 | 11/1982 |
| DE | 31 48 600 A2 | 7/1983 |
| DE | 3600230 | 7/1987 |
| DE | 37 35 808 A1 | 5/1988 |
| DE | 19728637 | 3/1999 |
| DE | 203 03 484 U1 | 7/2004 |
| DE | 10 2009 023 142 A1 | 5/2009 |
| EP | 0070583 | 1/1983 |
| EP | 1048820 | 11/2000 |
| EP | 1808570 | 7/2007 |
| EP | 2 290 304 A1 | 3/2011 |
| EP | 2 385 328 A2 | 11/2011 |
| FR | 2456919 A | 12/1980 |
| FR | 2817024 | 5/2002 |
| GB | 1496075 A | 12/1977 |
| GB | 2045909 A | 11/1980 |
| GB | 2434200 A | 7/2007 |
| GB | 2450754 B | 1/2012 |
| GB | 2482435 B | 3/2012 |
| GB | 2482436 B | 3/2012 |
| JP | 50022949 A | 3/1975 |
| JP | 57058024 | 4/1982 |
| JP | 62000741 A | 1/1987 |
| JP | 55134264 A | 10/1989 |
| JP | H08506652 | 7/1996 |
| JP | 09060985 A | 3/1997 |
| JP | 2001-183030 A | 7/2001 |
| JP | 2001183030 | 7/2001 |
| JP | 2005-098594 A | 4/2005 |
| JP | 2005098594 | 4/2005 |
| JP | 2006-118851 A | 5/2006 |
| JP | 2006258406 A | 9/2006 |
| JP | 2006-292310 A | 10/2006 |
| JP | 2006292310 | 10/2006 |
| JP | 2007024342 A | 2/2007 |
| JP | 2008-292044 A | 12/2008 |
| JP | 2009287912 A | 12/2009 |
| WO | WO 82/02935 A | 9/1982 |
| WO | WO 83/01272 A1 | 4/1983 |
| WO | WO 94/18510 A1 | 8/1994 |
| WO | WO 01/42721 A | 6/2001 |
| WO | WO 03/069240 A | 8/2003 |
| WO | WO 2007/097701 A | 8/2007 |
| WO | WO 2008/034970 A1 | 3/2008 |
| WO | WO 2009/006794 A1 | 1/2009 |
| WO | WO 2009/007683 A1 | 1/2009 |
| WO | WO 2009/007684 A1 | 1/2009 |
| WO | WO 2010/053424 A1 | 5/2010 |
| WO | WO 2011/017450 A2 | 2/2011 |

OTHER PUBLICATIONS

Combined Search and Examination Report for GB 1103916.1, dated Jul. 8, 2011.

International Search Report and Written Opinion of the International Searching Authority for PCT/GB2008/002269, date of mailing Oct. 16, 2008.

Great Britain Search Report for GB 0713178.2, date of search Feb. 26, 2008.

International Search Report and Written Opinion of the International Searching Authority for PCT/GB2008/002274, date of mailing Oct. 16, 2008.

Great Britain Search Report for GB 0713177.4, date of search Sep. 10, 2007.

Great Britain Examination Report for GB0713177.4, dated Sep. 28, 2010.

United Kingdom Search Report for GB0811013.2 dated Aug. 8, 2008.

United Kingdom Search Report for GB0811013.2 dated Dec. 18, 2008.

International Search Report and the Written Opinion, International Application No. PCT/EP2012/072332, entitled: Orienting and Supporting a Casing of a Coaxial Geothermal Borehole, Date of Mailing: Jul. 3, 2013.

(56) References Cited

OTHER PUBLICATIONS

Combined Search and Examination Report for GB 1119470.1, Dated Mar. 13, 2012.
Combined Search and Examination Report for GB 1215986.9, Dated Sep. 21, 2012.
Combined Search and Examination Report in GB 1218685.4, Dated Nov. 6, 2012.
International Preliminary Report and Written Opinion, International Application No. PCT/EP2012/072332, entitled: Orienting and Supporting a Casing of a Coaxial Geothermal Borehole, Date of Mailing: May 13, 2014.

* cited by examiner

THERMAL ENERGY SYSTEM AND METHOD OF OPERATION

This application is the U.S. National Stage of International Application No. of PCT/EP2009/057379, filed Jun. 15, 2009, which designates the U.S., published in English, and claims priority under 35 U.S.C. §§119 or 365(c) to Great Britain Application No. 0811013.2, filed Jun. 16, 2008.

The present invention relates to a thermal energy system and to a method of operating a thermal energy system. The present invention has particular application in such a system coupled to or incorporated in a refrigeration system, most particularly a large scale refrigeration system, for example used in a supermarket.

Many buildings have a demand for heating and or cooling generated by systems within the building. For example, heating, ventilation and air conditioning (HVAC) systems may at some times require a positive supply of heat or at other times require cooling, or both, heating and cooling simultaneously. Some buildings, such as supermarkets, incorporate large industrial scale refrigeration systems which incorporate condensers which require constant sink for rejection of the heat. Many of these systems require constant thermometric control to ensure efficient operation. Inefficient operation can result in significant additional operating costs, particularly with increasing energy costs. A typical supermarket, for example, uses up to 50% of its energy for operating the refrigeration systems, which need to be run 24 hours a day, 365 days a year, and a typical 35,000 square foot supermarket may spend £250,000 pounds per annum on electricity costs.

The efficiency of a common chiller utilizing a mechanical refrigeration cycle is defined by many parameters and features. However, as per the Carnot Cycle, the key parameter for any highly efficient refrigeration cycle is the quality of the energy sink determined by the Condenser Water Temperature (CWT) e.g. the temperature of a coolant supplied to the refrigerant condenser from an external device.

The importance of CWT to the performance of a chiller should not be underestimated; for instance, the condenser of a refrigeration system that receives a constant coolant flow at a CWT of about 18° C. would typically consume about half as much electrical energy than an equivalent system receiving a constant coolant flow at a CWT of about 29° C.

The quality of the CWT is closely linked to the amount of the Total Heat of Rejection (THR) supplied to the energy sink from the refrigeration cycle i.e. as the CWT increases, so more work will be required from the compressors to meet the required chilling demand, and additional electrical energy to drive the compressors is converted into waste heat that is additional to the heat of absorption from the evaporators, resulted in higher outlet temperatures and hence higher return temperatures of a coolant from external device. Such a spiral growth of the generated heat demands even greater compressor power to achieve a state of equilibrium in the refrigeration cycle. In other words, an inefficiency resulting from the CWT can cause yet more inefficiency in the operation of the energy sink on top of any inefficient existing before commencement of the refrigeration cycle.

A variety of technologies has been developed and is being actively used for heat rejection within the air conditioning (comfort cooling) and refrigeration industries. These technologies employ different principles described below. However, it is important to note that the most efficient sink for heat rejection is an external water source of certain stable temperature such as aquifer water. However, an average size commercial cooling or refrigeration system requires significantly more water than can be sustainably produced without causing major problems to the underlying water table. Therefore, this method of heat rejection is desirable but environmentally irresponsible, which has been widely recognized by national environmental agencies.

For example, it is known to use an open loop geothermal system for heat rejection, for example from a refrigeration system in which an independent extraction borehole is employed to provide aquifer water for cooling and an independent heat sink, such as a dissipation reed bed, is employed to remove waste heat from a waste heat generating system, such as a refrigeration system. Such an open loop can provide a good heat sink as the aquifer water comes at constantly low temperature in the range from 12° C. to 15° C. However, such a system also suffers from the problem that it requires extraction of a very large volume of aquifer water (for example about 500,000 m$^3$/year for a large supermarket refrigeration system).

Sometimes, extracted water, after being used, is re-injected into one or more separate boreholes which communicate with the same or a different aquifer. However, this can often cause a so-called "skin effect", as water being injected under high pressure often causes slow disintegration of the rock, with the result that small rock particles can clog formations, so stopping normal aquifer flow. This can significantly damage the balance of the complex water table system.

Apart from aquifer water and rather rare methods such as absorption and thermoelectric cooling, there are four main groups of mechanical devices designed for heat rejection and most actively exploited within comfort cooling and refrigeration industries:

1. Open circuit cooling towers e.g. systems primarily employing fan assisted evaporative cooling.
2. Closed loop cooling towers including hybrids involving limited evaporative cooling or adiabatic water evaporation e.g. dry air-coolers primarily employing fan assisted sensible heat transfer in to the atmospheric air.
3. Remote condensers e.g. external devices utilising a modified reversed Rankine cycle, in which saturated vapour is compressed within coils to a high pressure followed by a cooling phase achieved by fan assisted ambient air flow which passes through the coils until the point that the compressed gas condenses to a liquid by which time saturated liquid flashes to the low-pressure vaporiser through a valve to begin a new cycle.
4. Closed ground loop heat exchangers, including closed loop lake bed heat exchangers e.g. sensible heat transfer process between coolant and medium of high density, high thermal mass and stable predictable temperatures.

Although each group has own advantages and disadvantages, open circuit cooling technologies for a mechanical refrigeration cycle are by far the most favorable technology over the other three groups listed above. The main concept behind this group is based on a method of heat rejection termed "evaporative". Over many decades evaporative cooling was the dominating technology due to its outstanding heat rejection characteristics and cost competitiveness.

Evaporative heat rejection devices such as cooling towers are used to provide significantly lower return water temperatures than achievable by use of other known heat rejection methods. Because evaporative cooling is based on persistently lower wet-bulb temperature rather than dry-bulb atmospheric temperatures, with the temperature difference, depending on the particular climate, typically vary from 5.5° C. to 16.7° C., these devices experience a greater ΔT between the coolant and the air at times when the cooling energy demand of the system is greatest. No less importantly, the evaporative cooling process involves both sensible and latent heat transfer, with the former playing a principle role since latent heat transfer requires 233 to 349 m$^3$/h per kW less air flow than the corresponding fan power required by sensible heat transfer devices i.e. the closed loop cooling towers of the second group listed above.

As a result, chillers paired with an open circuit cooling tower may save on average 30%-35% energy in comparison to equivalent chillers paired with other devices, by being capable to deliver a stable CWT at a typical temperature level of about 28° C.-29° C. during the late spring-summer season in comparison to 32° C.-35° C. or even higher, from closed circuit cooling towers. For an industrial size chiller plant such significant difference in efficiency can insure savings in hundreds of thousand pounds per annum.

It is important to note that with exception to the fourth group, all technologies within first three groups are capable to demonstrate certain improvements in performance during the winter months when ambient air temperature is low.

The biggest downside of devices employing a method of evaporative cooling is the ever growing value of precious water and the high cost of chemical treatment of water utilised in open circuits. A typical evaporative cooling tower designed for dissipation of 1000 kW of waste heat from a chiller plant consumes about 14,500 m$^3$ of water/year. In the UK, the average cost of treated water for a cooling tower currently exceeds £3 per m$^3$.

Such increasing costs sometimes lead to owners trying to reduce the operational costs of water treatment, resulting in water being not properly treated, which can result in an outbreak of lethal Legionnaires' disease.

In these circumstances, the benefits of using evaporative cooling towers are declining because the cost savings are becoming marginal. However, the other described methods of heat rejection that consume significantly more electrical energy, with exception to the ground coupled heat exchangers, are becoming increasingly expensive due to rising energy costs.

Some measures could be applied in order to improve the level of efficiency of these technologies as to provide highly efficient heat rejection methods to insure a premium quality heat sink. However, if during the past few decades such developments were not made even in an era having a low cost of energy and a quick payback on capital expenditure, nowadays new circumstances related to water and energy costs create a nearly impermeable barrier to the widespread development and implementation of these technologies.

The present invention provides a thermal energy system comprising a first thermal system, the first thermal system in use having a heating and/or cooling demand, a closed loop geothermal energy system comprising a plurality of borehole heat exchangers containing a working fluid, and an intermediate heat pump thermally connected between the first thermal system and the geothermal energy system.

Preferably, each borehole heat exchanger comprises an elongate tube having a closed bottom end and first and second adjacent elongate conduits interconnected at the bottom end.

Preferably, the first thermal system comprises a refrigeration system.

More preferably, the thermal energy system may further comprise at least one heat exchanger system coupled to a condenser of the refrigeration system to recover thermal energy from the refrigeration system and coupled to the intermediate heat pump.

Preferably, the closed loop geothermal energy system comprises first and second groups of borehole heat exchangers, each group being selectively and alternately connectable to the intermediate heat pump.

More preferably, the thermal energy system may further comprise a second thermal system, the second thermal system being thermally connected the geothermal energy system, wherein the first and second thermal systems respectively have opposite net thermal energy demands from the geothermal energy system.

Yet more preferably the first and second thermal systems respectively have net cooling and heating thermal energy demands from the geothermal energy system.

The thermal energy system may further comprise a control system adapted selectively and alternately to thermally connect the intermediate heat pump or the second thermal system to the first or second groups of borehole heat exchangers in a succession of alternating cycles.

The thermal energy system may further comprise at least one heat exchanger system coupled to the first thermal system and coupled to the intermediate heat pump, and wherein the heat pump is thermally connected between the first thermal system and the geothermal energy system by a first heat exchange loop between the intermediate heat pump and the heat exchanger system and a second heat exchange loop between the heat pump and the geothermal energy system.

Preferably, the geothermal energy system further comprises a manifold for the working fluid to which the plurality of borehole heat exchangers is connected, and a plurality of valves connected between the plurality of borehole heat exchangers and the manifold, whereby the first and second conduits of the plurality of borehole heat exchangers are selectively connectable to the manifold by operation of the valves whereby each group of borehole heat exchangers can be operated to provide flow of the working fluid therethrough in a selected direction.

Preferably, the valves are arranged to permit selective passing of the working fluid through a selected group of the borehole heat exchangers in a respective selected direction with respect to the respective first and second conduits of the respective borehole heat exchanger.

Preferably, the plurality of borehole heat exchangers extends downwardly and laterally into the ground from a central surface assembly of the elongate tubes to define a ground volume of the geothermal energy system which encloses the plurality of borehole heat exchangers, and wherein a footprint area of the central surface assembly is less that 10% of a footprint area of the ground volume of the geothermal energy system.

The thermal energy system may further comprise a control module connected to the plurality of borehole heat exchangers for controlling the valves for selectively distributing the working fluid within the plurality of borehole heat exchangers to achieve a particular thermal energy profile for the geothermal energy system, and the control module is adapted to control the thermal energy supply to or from first and second thermal systems.

Preferably, the geothermal energy system and the intermediate heat pump are exterior of a building containing the first and second thermal systems.

The thermal energy system may further comprise a conduit loop for the working fluid extending from the geothermal energy system to the first thermal system which bypasses the intermediate heat pump.

Preferably, the conduit loop comprises first and second inlet conduits extending respectively from the first and second groups of borehole heat exchangers to a common thermostatic mixing valve and an outlet conduit extends from the thermostatic mixing valve, through the first thermal system and back to the borehole heat exchangers.

The thermal energy system may further comprise a heat exchanger cooling loop connected to the geothermal energy system, the heat exchanger cooling loop being adapted selectively to cause cooling of the working fluid within selected borehole heat exchangers.

Preferably, the heat exchanger cooling loop is controlled by a timer which permits operation of the heat exchanger cooling loop during a selected time period.

Preferably, the heat exchanger cooling loop is adapted to expel excess heat therefrom to the atmosphere.

The present invention further provides a thermal energy system comprising a refrigeration system, the refrigeration system including at least one condenser which, in use, has a cooling demand, a closed loop geothermal energy system comprising a plurality of borehole heat exchangers containing a working fluid arranged to constitute a heat sink for the at least one condenser, an intermediate heat pump thermally connected between the at least one condenser and the geothermal energy system, and a control system adapted selectively and alternately to thermally connect the intermediate heat pump to first or second groups of the borehole heat exchangers in a succession of alternating cycles so that in one cycle the first group constitutes the heat sink and in a successive cycle the second group constitutes the heat sink.

The present invention further provides a method of operating a thermal energy system, the thermal energy system comprising a first thermal system, the method comprising the steps of;

(a) providing a first thermal system having a heating and/or cooling demand;

(b) providing, a closed loop geothermal energy system comprising a plurality of borehole heat exchangers containing a working fluid, (c) providing an intermediate heat pump thermally connected between the first thermal system and the geothermal energy system;

(c) controlling the thermal connection between the first thermal system and the geothermal energy system via the intermediate heat pump to provide a heat source or a heat sink for the first thermal system.

The first thermal system may comprise a refrigeration system and the geothermal energy system and the intermediate heat pump are controlled to provide a heat sink for the refrigeration system.

The method may further comprise recovering thermal energy from the refrigeration system and transferring the recovered thermal energy to the intermediate heat pump by at least one heat exchanger system coupled between a condenser of the refrigeration system and the intermediate heat pump.

Preferably, the controlling step divides the closed loop geothermal energy system into at least first and second groups of borehole heat exchangers, each group being selectively and alternately connected to the intermediate heat pump in the controlling step.

Preferably, the method further comprises providing a second thermal system, the second thermal system being thermally connected the geothermal energy system, wherein the first and second thermal systems respectively have opposite net thermal energy demands from the geothermal energy system.

Preferably, the first and second thermal systems respectively have net cooling and heating thermal energy demands from the geothermal energy system.

Preferably, in the controlling step the intermediate heat pump and the second thermal system are selectively and alternately thermally connected to the first and second groups of borehole heat exchangers in a succession of alternating cycles.

Preferably, the plurality of borehole heat exchangers are selectively connectable to the first and second thermal systems whereby each group of borehole heat exchangers can be operated to provide flow of the working fluid therethrough in a selected direction.

The method may further comprise controlling the selective distribution of the working fluid within the plurality of borehole heat exchangers to achieve a particular thermal energy profile for the geothermal energy system, and to control the thermal energy supply to or from the first and second thermal systems.

The method may further comprise providing a conduit loop for the working fluid extending from the geothermal energy system to the first thermal system which bypasses the intermediate heat pump, and providing first and second inlet flows respectively from the first and second groups of borehole heat exchangers to a common thermostatic mixing valve and an outlet flow of predetermined temperature from the thermostatic mixing valve, through the first thermal system and back to the borehole heat exchangers.

The method may further comprise causing selective cooling of the working fluid within selected borehole heat exchangers by using a heat exchanger cooling loop connected to the geothermal energy system.

Preferably, the selective cooling is controlled by a timer which permits operation of the heat exchanger cooling loop during a selected time period.

Preferably, the heat exchanger cooling loop expels excess heat therefrom to the atmosphere.

The present invention also provides a method of operating a thermal energy system, the thermal energy system comprising a refrigeration system including at least one condenser having a cooling demand, the method comprising the steps of;

(a) providing a closed loop geothermal energy system comprising a plurality of borehole heat exchangers containing a working fluid arranged to constitute a heat sink for the at least one condenser;

(b) providing an intermediate heat pump thermally connected between the at least one condenser and the geothermal energy system; and (c) selectively and alternately thermally connecting the intermediate heat pump to first or second groups of the borehole heat exchangers in a succession of alternating cycles so that in one cycle the first group constitutes the heat sink and in a successive cycle the second group constitutes the heat sink In particular, the preferred embodiments of the present invention relate to the expansion into the ground strata of one or more borehole heat exchangers from a limited surface space yet which is capable of large scale harvesting of low enthalpy geothermal energy, and is also, selectively, capable of injecting of industrial volumes of excess energy with use of the ground strata as the thermal energy store. The borehole heat exchangers are connected via an intermediate heat pump to at least one thermal system in a building, the or each thermal system having a cooling demand, or a heating demand, and when plural thermal systems are present they may have different and/or opposite heat demands. Most particularly, the thermal system in the building is a refrigeration system having a cooling or negative heat demand from the geothermal system.

The preferred embodiments of the present invention can provide a low enthalpy, geothermal energy storage and retrieval installation that can be precisely matched to existing and newly constructed building services systems that delivers space heating, cooling, ventilation and hot water services to a wide range of buildings on an industrial or community-based scale with very high efficiency, low carbon emissions and with a compact surface footprint. In addition, the installation may be operated principally, and selectively, as a thermal energy source, sink or store depending upon the relevant building(s) requirement for heating and cooling over time.

The installation can also provide for the efficient exchange of thermal energy between adjacent buildings and faculties so as to conserve available energy. Furthermore, the installation may also include additional thermal energy sources or sinks such as sub-surface aquifers, adjacent water reservoirs or water pumping systems and is readily combined with other renewable energy sources and other heating or cooling loads to further reduce overall carbon emissions.

The preferred embodiments of the present invention utilise a number of specific differences as compared to known ground coupled heat exchange systems, from other known technologies actively employed for heat rejection, and from the known typical use of ground heat exchangers for direct rejection of heat, primarily from small to medium size water-to-water (brine) heat pumps.

The preferred embodiments of the present invention relate to the use of a specific type of coaxial ground heat exchanger, a borehole heat exchanger (BHE), with high volumetric and mass flow characteristics, expanded contact space, low thermal short circuiting between down and up going flows, low thermal resistance of the BHE and extended subsurface spacing to prevent thermal interference.

Such a system incorporating such BHEs allows higher thermal stress on rock formations and higher thermal recovery rates, and most importantly this type of BHE requires relatively low power for circulating the working fluid. With a head pressure of from 5 m to 6.5 m and a flow resistance in the range from 50 kPa to 65 kPa, this type of ground coupled system of 1,000 kW nominal capacity would require about 5 kW circulation power to provide a mass flow having a volume of up to 50 kg/sec. This may be compared to the power requirements, of an open circuit cooling tower of equivalent capacity, for circulation and fans in the range of 25 kW as the best competitive technology in terms of electrical energy consumption.

The lower power requirements of such system in the absence of other expenditures related to running cost can allow use of an additional intermediate heat pump acting as a thermal grade transformer between the system of BHEs and an industrial chiller in the preferred embodiments of the present invention.

The intermediate heat pump in the preferred embodiments of the present invention may operate with a typical short lift range (i.e. the temperature range on the hotter side of the heat pump, the colder side being connected to the condenser either directly or indirectly via a heat exchange system) of from 32° C.-33° C. to achieve a stable CWT of, for example, about 18° C. at the condenser of the refrigeration system. Such short lift can correspondingly permit the achievement of high efficiency rates, defined in the art as the coefficient of performance (COP), typically from COP 5.1 to 5.0, which in turn allows energy savings of up to 50% in comparison to the performance of similar chiller based on the CWT being provided by an open circuit cooling tower.

In such a system, employing an intermediate heat pump, the geothermal system of a preferred embodiment of the present invention may consist of two banks of BHEs operating alternately in sequence, having an ON/OFF operating regime, for example with a 12 hour off period following 12 hour on period. Other time periods may be employed. In the on period the working fluid temperature of the bank increases as a result of thermal energy rejection from the refrigeration system into the bank, whereas in the off period the working fluid temperature of the bank decreases as a result of thermal energy passage from the bank into the adjacent rock which is at a lower temperature (the typical ground temperature is 18° C.). For typical rock conditions, in the off period the temperature of the respective bank may recover by reducing to a level of 23° C. (which provides a COP of 6.3 to achieve a CWT of 18° C.) whereas in the preceding, and successive, on period, the temperature of the respective bank may increase to a level of 30° C. (which provides a COP of 5.2 to achieve a CWT of 18° C.) by the end of 12 hour bank duty on period. The average COP in such an arrangement would be at a level of COP 5.6, assuming a typical rate for the total heat rejection (THR).

However, as result of a significantly lowered CWT provided to the condenser and a highly efficient regime for operation of the intermediate heat pump, the amount of THR from the refrigeration system may be significantly reduced, thereby allowing further savings in both total capacity of the ground coupled system and overall running cost related to heat rejection.

The provision of alternating banks, e.g. two, of BHEs can also allow the use of the "resting" bank, during a typical 12 hour resting phase, which has working fluid at a high temperature that requires to be cooled prior to the next operational phase, also typically of 12 hours duration, to be employed for meeting at least partially the heating requirements of the same building, since such a resting bank of BHEs will consist of thermal energy at favorable temperature for heating or hot potable water purposes. Assuming that there is a heat demand and another heat pump is available to satisfy such building's demand in heating, it is possible to repeat the short uplift represented by high COP for heating purposes, at the same time providing assistance in recovery of the bank during its resting mode.

During the winter months, it should not be unusual to see a greatly overweighed heating demand in comparison to the reduced demand in refrigeration or cooling. In all these cases, the resting bank of BHEs can outsource more energy for the building's HVAC system than energy discharged during its previous cooling duty. This would be represented by the working fluid of the BHEs being at a lower temperature than required by the refrigeration system at beginning of a new cooling shift. The utilization of a lower working fluid temperature than required by a particular system is not necessarily advantageous as this might cause a loss in capacity of the refrigeration plant. In this case, the installation within the system of a thermostatic mixing valve which can provide the prescribed CWT by an automatic outsourcing of energy from the bank that previously serviced the refrigeration system. This can be achieved by providing a line from the BHEs to the refrigeration system that bypasses the intermediate transformer heat pump and incorporates the thermostatic mixing valve to mix two working fluid flows, one flow at a relatively low temperature from the operational bank and one flow at a relatively high temperature from the resting bank. The thermostatic mixing valve controls the two flow rates and accordingly mixes the flows to achieve a desired outflow temperature that is directed to the refrigeration system. This bypassing of the heat pump can permit the heat pump to be unoperational for at least a proportion of the operating period, with the temperature of the working fluid from the BHEs being solely controlled by the thermostatic mixing valve. This can yield significant savings in operational costs, because if the heat pump is not operational, there is no electrical energy requirement to drive its associated pump and compressor.

Embodiments of the present invention will now be described by way of example only, with reference to the accompanying drawings, in which.

Figure 1:
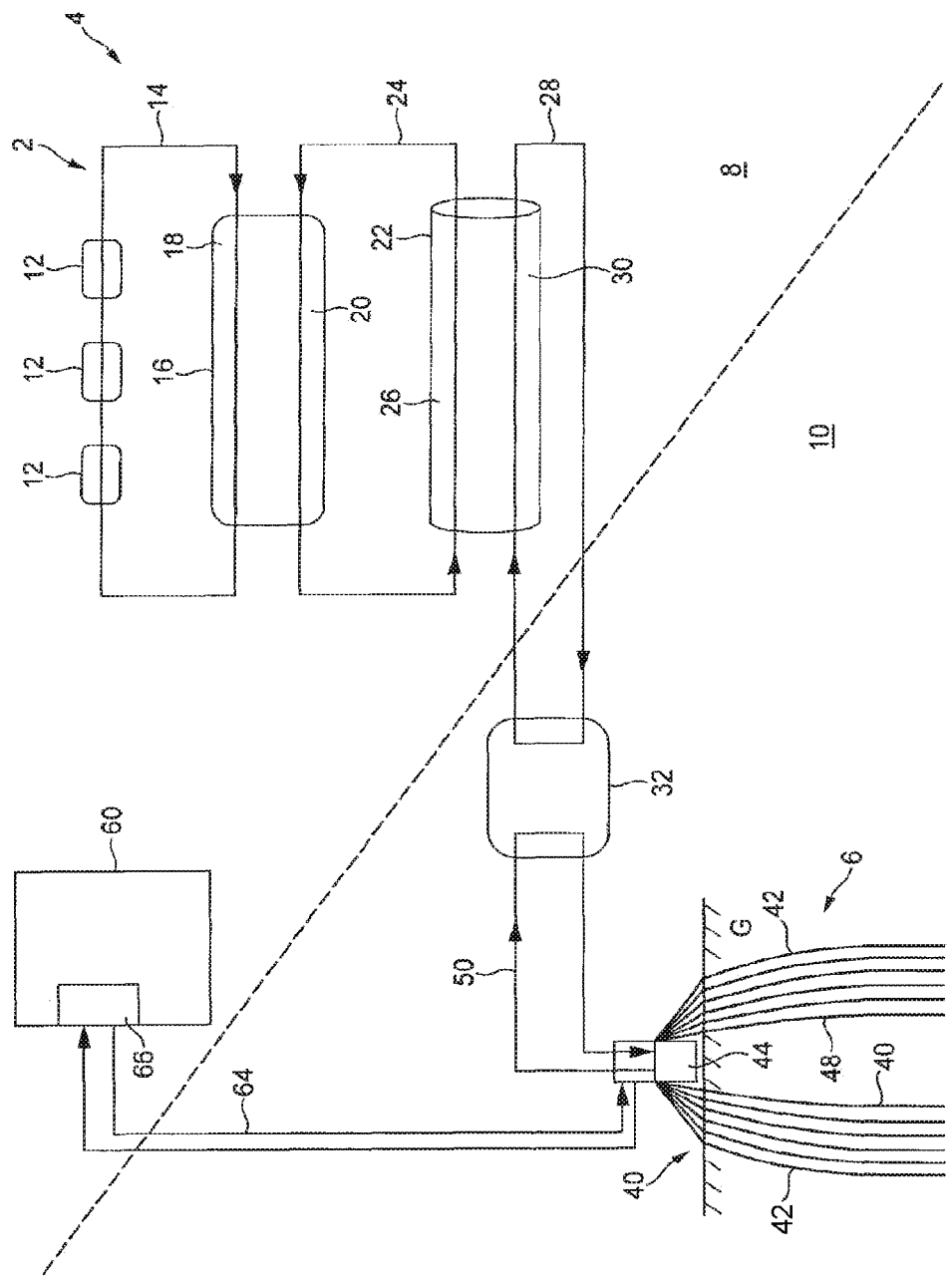
FIG. 1 is a schematic diagram of a thermal energy system including a refrigeration system of a supermarket coupled to a closed loop geothermal energy system in accordance with a first embodiment of the present invention.

In the drawings, like parts are identified by like reference numerals for the common features of the various embodiments Although the preferred embodiments of the present invention concern thermal energy systems for interface with refrigeration systems, other embodiments of the present invention relate to other building systems that have a demand for heating and/or cooling generated by systems within the building, for example heating, ventilation and air conditioning (HVAC) systems, which may require a positive supply of heat and/or cooling, or a negative supply of heat. Many of these systems, like refrigeration systems, require very careful and constant thermometric control to ensure efficient operation.

Referring to FIG. 1, there is shown schematically a refrigeration system 2 of a supermarket 4 coupled to a closed loop geothermal energy system 6 in accordance with an embodiment of the present invention. The entire system has an in-store side 8, within the supermarket 4, and a water-loop side 10, exterior to the supermarket 4.

The supermarket 4 has a plurality of in-store refrigeration cabinets 12. The refrigeration cabinets 12 are disposed in an in-store refrigerant loop 14 which circulates refrigerant between the cabinets 12 and a condenser 16. One or more compressors (not shown) are provided in association with the condenser, in known manner. More than one loop 14 may be provided, coupled with a common condenser 16, or each loop 14 having its own condenser 16. One or more of the loops 14 may have only a single refrigeration cabinet 12. Within a loop 14, the refrigeration cabinets 12 may be serially connected or connected in parallel. Various refrigerator configurations may be employed in accordance with the present invention, dependent upon the size and layout and refrigeration demand of the particular supermarket, and would be readily apparent to those skilled in the art of refrigeration systems.

Whatever cabinet/loop configuration is selected for the refrigeration system 2 for the supermarket 4, in the condenser 16 the gaseous refrigerant from the refrigeration cabinets 12 is condensed to a liquid to generate thermal energy on a first side 18 of the condenser 16. The second side 20 of the condenser 16 is coupled to a heat exchanger 22, such as a tube-in shell heat exchanger, in a first-stage heat exchanger loop 24. Thermal energy from the first side 18 heats up the fluid of the first-stage heat exchanger loop 24 conveyed through the second side 20. The heated fluid is conveyed through a first side 26 of the heat exchanger 22 and gives up thermal energy to a second-stage heat exchanger loop 28 connected to the second side 30 of the heat exchanger 22.

The second-stage heat exchanger loop 28 bridges the in-store side 8 and the water-loop side 10. The second-stage heat exchanger loop 28 also includes a heat pump 32, incorporating a compressor. In the second-stage heat exchanger loop 28, a fluid, typically water, is circulated around the loop 28. Typically, the water enters the heat exchanger 22 from the heat pump 32 at a temperature of about 14 degrees centigrade and the water passes from the heat exchanger 22, in which the water has been heated on the second side 28, to the heat pump 32 at a temperature of about 18 degrees centigrade. On the water-loop side 10, the heat pump 32 is coupled to the geothermal energy system 6. The heat pump 32 comprises, as is well known in the art, a thermal transformer system to cause, as required, a thermometric difference between the input side and the output side, which may constitute heating or cooling, yet with substantially equal energy input and output on the respective sides.

The geothermal energy system 6 comprises an array 40 of borehole heat exchangers 42 connected to a common manifold unit 44. The array 40 is subterranean, and typically three-dimensional below the ground surface G, and the common manifold unit 44 is typically located above ground.

The array 40 is a compact array (or a combination of multiple sub-arrays) of coaxial borehole heat exchangers 42 (BHE). The borehole heat exchangers 42 are installed in boreholes that are directionally drilled from a rigid structure (not shown) comprising one or more pads, preferably of concrete, in the near vicinity of the building being served. The borehole heat exchangers 42 may be installed vertically, inclined or horizontally in the subsurface formations, and each borehole heat exchanger 42 may have a varied inclination along its length, and/or may be divided into successive segments, of the same or different length, along its length, each segment having a different orientation from the adjacent segment(s). The borehole heat exchangers 42 in each group 46, 48 may be arranged in a fan-like configuration, oriented in a substantially common direction, in a star-like configuration, extending substantially radially away from the manifold 44 and equally mutually spaced, or in a substantially linear configuration, substantially aligned along the length thereof, and each has, apart from an initial sharply angled connection to the manifold 44, a single substantially inclined portion extending downwardly and laterally away from the manifold 44. The lengths and inclinations of the various portions can vary for the borehole heat exchangers.

In addition, an individual borehole heat exchanger may be split into two or more branches (multi-leg completion) from some point below the surface, according to design requirements. The lengths and inclinations of the various portions can vary for the borehole heat exchangers. The array 40 is structured and dimensioned to achieve mutual spacing between the borehole heat exchangers, so that each of them is substantially thermally independent. Typically, the bottom ends of the lower portions of the borehole heat exchangers 42 are mutually spaced by least 100 meters.

The borehole heat exchanger array(s) of the preferred embodiments may be located with regard to the spatial orientation of the bedding planes, porosity and permeability, especially large fractures, which are a feature of the ground formations in the installation area. This can enhance the thermal efficiency of the borehole heat exchanger by drilling the containing boreholes in a manner so as to physically intercept the ground formations in the most favourable orientation that may take advantage of groundwater accumulations and subsurface flows.

The typical vertical depth range of the borehole heat exchangers is from 10 to 750 meters below ground level although greater depths are possible. In an array of borehole heat exchangers, typically at least one of the borehole heat exchangers extends to a vertical depth of at least 100 meters, and up to 750 meters.

The common manifold unit 44 is configured, temporarily or permanently, to divide the array 40 of borehole heat exchangers 42 into a first group 46 and a second group 48. In each group 46, 48, the respective borehole heat exchangers 42 can be commonly switched by valve mechanisms within the central common manifold unit 44 to permit fluid flow in a respective selected flow direction of the coaxial borehole heat exchangers 42.

In the embodiment of FIG. 1, each group 46, 48, comprises six coaxial borehole heat exchangers 42, although the total number and the number within each group may be varied, and the two groups 46, 48 may have a different number of borehole heat exchangers 42. Typically, each group 46, 48 has substantially the same number, type, and arrangement of the coaxial borehole heat exchangers 42, so that the heating and cooling capabilities of each group 46. 48 are substantially the same.

In further modifications, a different number of groups is provided, for example three, four or even more groups.

The groups may not be physically distinguishable within the ground, but may only be distinguishable by their above-ground connections to each other, for example within the manifold.

The footprint of the manifold 44 is significantly less, typically less than 10%, more preferably less than 5%, most preferably less than 1%, than the area of the footprint of the ground volume containing the borehole heat exchangers 42.

With such an array and manifold combination, the first and second groups 46, 48 of borehole heat exchangers 42 may be selectively connected to the manifold 44 by operation of the valves according to a positive or negative heat demand, as described below.

The heat pump 32 is connected to the manifold 44 by a third-stage heat exchanger loop 50, which also includes the coaxial borehole heat exchangers 42. Fluid is cycled around the loop 50 to extract thermal energy from the refrigeration system 2 on the in-store side 8 and store the extract thermal energy in the array 40 of borehole heat exchangers 42. Typically, the fluid enters the manifold 44 from the heat pump 32 at a temperature of about 35 degrees centigrade and the water passes from the manifold 44 to the heat pump 32 at a temperature of about 30 degrees centigrade.

A heating, ventilation and air conditioning (HVAC) system 60 within the supermarket 4 provides temperature-regulated air to the building according to a thermostat-controlled heat demand of the building. A heat exchanger 66 within the HVAC system 60 is connected by a HVAC loop 64 to the manifold 44.

In accordance with the embodiment of the present invention, the manifold 44, by selective operation of the valves therein, is adapted selectively to provide thermal energy, as required by the heat demand, to the HVAC system 60 and to extract thermal energy, via the heat pump 32, from the refrigeration system 2.

The HVAC system 60 typically has a net heating demand over an extended period, given that the heating function may have a positive heat demand at some times whereas an air-conditioning function may have a negative (i./e. cooling) heat demand at other times, and the demands, and the dominance of the net current positive or negative demand, may vary with time, for example depending on the time of the year and/or weather/environmental conditions, and independently of the demand of the refrigeration system 2.

In a modified embodiment, the HVAC system 60 (comprising a second thermal system in addition to the first thermal system constituted by the refrigeration system 2) is coupled to the manifold 44 by a second intermediate heat pump (not shown), optionally additionally by a further heat exchange loop between the second intermediate heat pump and the HVAC system 60.

The second thermal system constituted by the HVAC system 60 and the first thermal system constituted by the refrigeration system 2 may be in the same or different buildings.

The selective operation is time dependent, and the first and second groups 46, 48 of borehole heat exchangers 42 are selectively and alternately connected via the manifold 44 to the HVAC system 60 and to the refrigeration system 2.

In a first phase of operation, the first group 46 of borehole heat exchangers 42 is connected via the manifold 44 to the refrigeration system 2 via the heat pump 32, and the fluid flow direction in the borehole heat exchangers 42 is such as to transfer thermal energy from the borehole heat exchangers 42 in the surrounding ground volume 70. This permits thermal energy retrieved by the refrigerant loop 14 and the heat exchanger loops 24, 28, 50 to be stored in the surrounding ground volume 70, according to a negative heat demand.

In a subsequent second phase of operation, the first group 46 of borehole heat exchangers 42 is connected via the manifold 44 to the HVAC system 60, and the fluid flow direction in the borehole heat exchangers 42 is reversed such as to transfer thermal energy from the surrounding ground volume 70 back into the borehole heat exchangers 42. This permits thermal energy previously stored in the surrounding ground volume 70 in the first phase to be recovered, and the recovered thermal energy is supplied to the HVAC system 60, according to a positive heat demand, by the HVAC loop 64.

In the first and second phases of operation, the second group 48 of borehole heat exchangers 42 is operated in an opposite manner to the first group 46 in the respective phase (i.e. in the same manner as the first group 46 in the preceding and succeeding phase). These two phases for the two groups 46, 48 of respective borehole heat exchangers 42 are alternately cycled between a heat recovery phase and a heat delivery phase. This effectively and efficiently recovers waste heat from the refrigeration system 2 and provides it to the HVAC system 60.

Typical cycle times are 12 hours for each phase. However, other cycle times may be employed, and the cycle times need not be constant or equal in the opposite phases.

The closed loop system disclosed herein provides an intermediate heat pump 32 between the geothermal system 6 and the heat exchanger system for the refrigeration chiller(s), in the form of the condenser(s) 16 in the refrigerant loop 14. The heat pump 32 is part of a thermally stable heat exchanger loop 50 incorporating the manifold 44 and the selected borehole heat exchangers 42, so that the temperature differential between the incoming and outgoing fluid flows of the heat pump 32 is substantially stable. This provides the advantage that the temperature of the condenser(s) 16 in the refrigerant loop 14 is stabilized, ensuring reliable and effective operation of the refrigeration system 2.

When the borehole thermal energy output exceeds the output of the condenser(s) 16 of the refrigeration system 2 to achieve the set CWT for the condenser(s) 16, the heat pump 32 is thermostatically switched into operation by a thermostat within the refrigeration system 2. The heat pump 32 can optimize the operation of the refrigeration cycle, and that of the geothermal cycle. Each cycle has a set optimized operating temperature, and the geothermal cycle in particular has a set ground temperature. This turning on, as required, of the heat pump 32 to provide optimized operation of the condenser(s) 16 of the refrigeration system 2 at the optimized CWT can provide typical energy savings of 20%. Typically, the heat pump 32 is switched periodically into operation by the thermostatic valve on the condenser side so that the heat pump 32 operates for about 90% of the refrigeration operating period, and in the remaining about 90% of the refrigeration operating period the condenser(s) 16 of the refrigeration system 2 are running at the optimized CWT without heat pump control.

The alternating use of a group of borehole heat exchangers first to recover and store heat in an associated ground volume, and then to deliver that stored heat before once again recovering and storing heat provides a thermally stable system, in which the associated ground volume can reliably store heat, assists in providing a thermally stable heat exchanger loop 50 including the heat pump 32.

Figure 2:
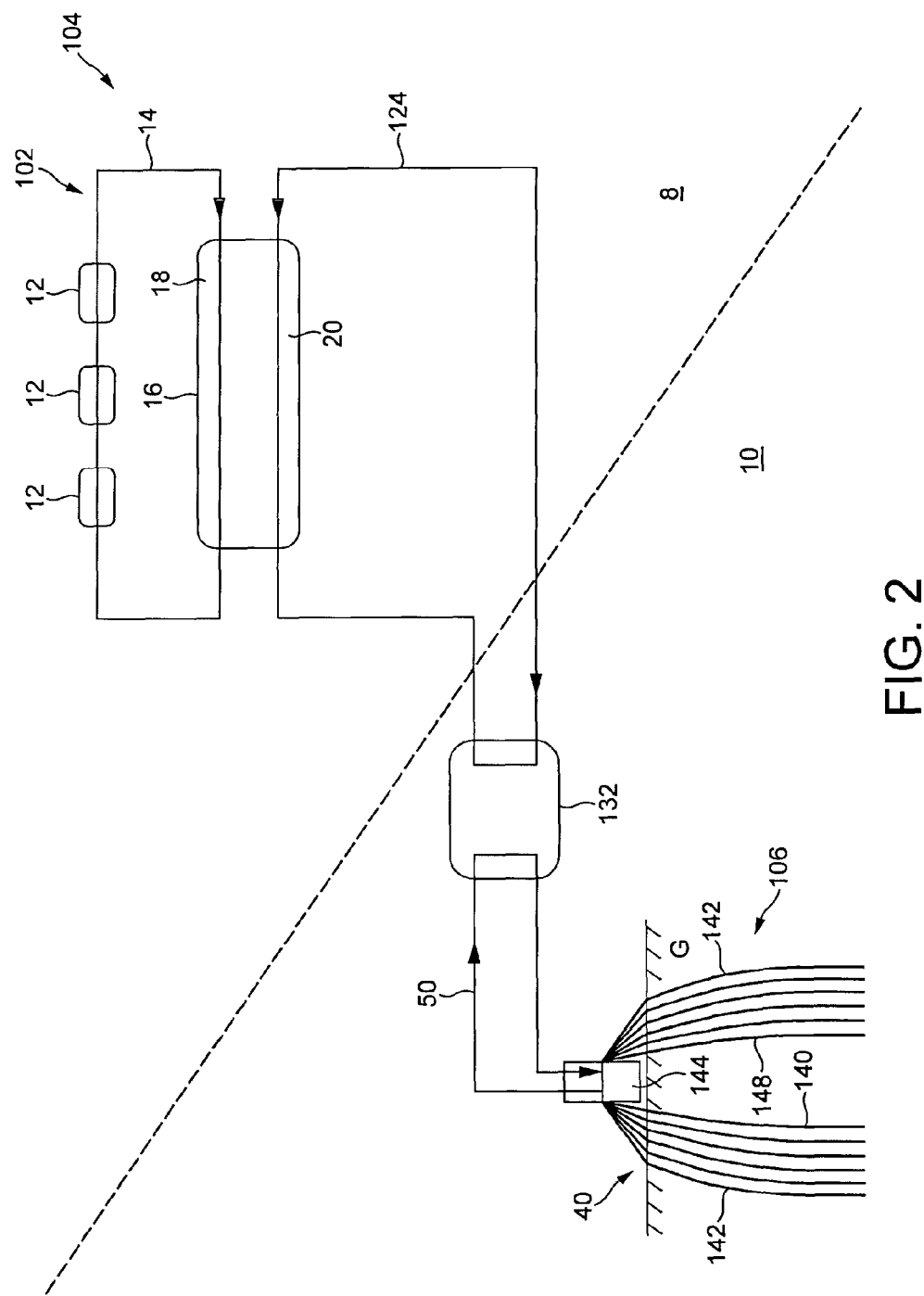
FIG. 2 is a schematic diagram of a thermal energy system including a refrigeration system of a supermarket coupled to a closed loop geothermal energy system in accordance with a second embodiment of the present invention.

Referring to FIG. 2, there is shown schematically a refrigeration system 102 of a supermarket 104 coupled to a closed loop geothermal energy system 106 in accordance with a second embodiment of the present invention. This embodiment is a modification of the first embodiment, in that there is no connection of the manifold 144 to a HVAC system. During the resting phase in which each group 146, 148 of borehole heat exchangers 142 is respectively permitted to cool, the excess heat simply conducts into the adjacent ground G and is not extracted for an above-ground heating demand.

In a further modification (which may be independently implemented), the intermediate heat pump 132 is thermally connected to the condenser(s) 116 of the refrigerant loop 14 by a single heat exchanger loop 124 that includes both the condenser(s) 116 and the intermediate heat pump 132. This avoids the need for an additional heat exchanger loop, and a further heat exchanger between the condenser(s) 116 and the intermediate heat pump 132, as in the first embodiment.

Figure 3:
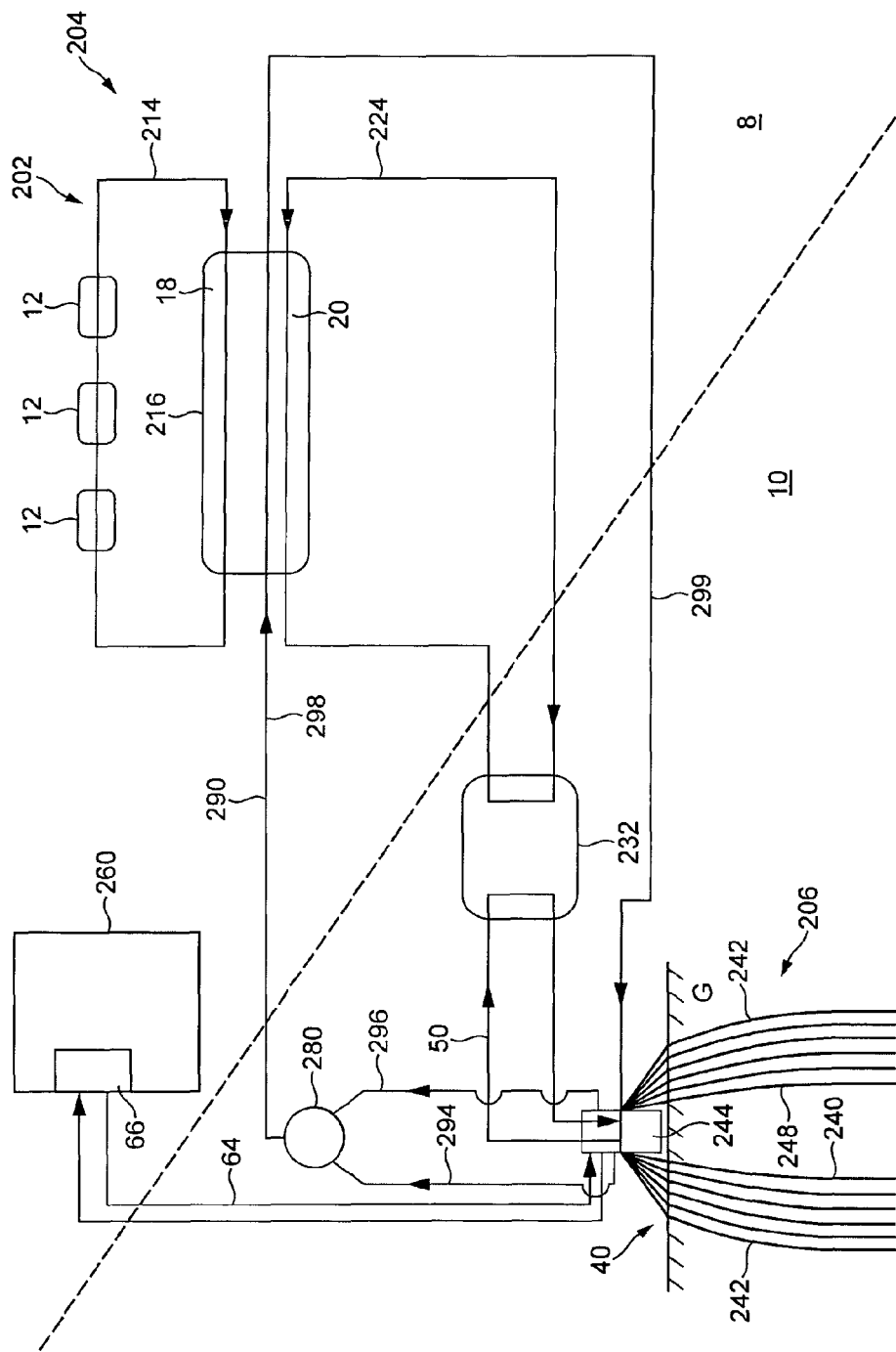
FIG. 3 is a schematic diagram of a thermal energy system including a refrigeration system of a supermarket coupled to a closed loop geothermal energy system in accordance with a third embodiment of the present invention.

Referring to FIG. 3, there is shown schematically a refrigeration system 202 of a supermarket 204 coupled to a closed loop geothermal energy system 206 in accordance with a third embodiment of the present invention.

In this embodiment, as for the second embodiment, the intermediate heat pump 232 is thermally connected to the condenser(s) 216 of the refrigerant loop 214 by a single heat exchanger loop 224 that includes both the condenser(s) 216 and the intermediate heat pump 232. However, in an alternative modification the use of a further heat exchanger loop as in the first embodiment may additionally be employed.

During the winter months, it should not be unusual to see a greatly overweighed heating demand of the HVAC system 260 in comparison to the reduced demand in refrigeration or cooling of the refrigeration system 202. In such a case, the resting group (or bank) 246 of BHEs 242 can outsource more energy for the building's HVAC system 260 than energy discharged into the group (or bank) 246 during its previous cooling duty. This would be represented by the working fluid of the BHEs 242 of that group 246 being at a lower temperature than required by the refrigeration system 202 at beginning of a new cooling shift. In other words, the resting phase, in which excess heat is provided to the HVAC system 260, overcools the temperature of the working fluid as compared to the desired temperature for the subsequent working (cooling) phase.

The utilization of a lower working fluid temperature than required by a particular system is not necessarily advantageous as this might cause a loss in capacity of the refrigeration plant. It is important that the refrigerant system is operated at the particular set temperature (i.e. the prescribed CWT) of the condenser for efficient and reliable operation. The overcooling of the working fluid can be used to advantageous effect, however, to save energy within the entire thermal energy system.

A thermostatic mixing valve 280 is installed within the system which can provide the prescribed CWT by an automatic outsourcing of energy from the group (or bank) of BHEs 242 that previously serviced the refrigeration system. This can be achieved by providing a line 290 from the BHEs 242 to the refrigeration system 202 that bypasses the intermediate transformer heat pump 232 and incorporates the thermostatic mixing valve 280 to mix two working fluid flows, one flow at a relatively low temperature from the operational bank 246 along a first conduit 294 and one flow at a relatively high temperature from the resting bank 248 along a second conduit 296. A common third conduit 298 leads from the thermostatic mixing valve 280 to the condenser 216 and a return conduit 299 feeds back to the manifold 244.

The thermostatic mixing valve 280 controls the two flow rates along the first conduit 294 and the second conduit 296 and accordingly mixes the flows to achieve a desired outflow temperature that is directed to the refrigeration system 202. This bypassing of the heat pump 232 can permit the heat pump 232 to be unoperational for at least a proportion of the operating period, with the temperature of the working fluid from the BHEs 242 being solely controlled by the thermostatic mixing valve 280. This can yield significant savings in operational costs, for example an energy saving of up to 20%, because if the heat pump 232 is not operational, there is no electrical energy requirement to drive its associated pump and compressor.

Figure 4:
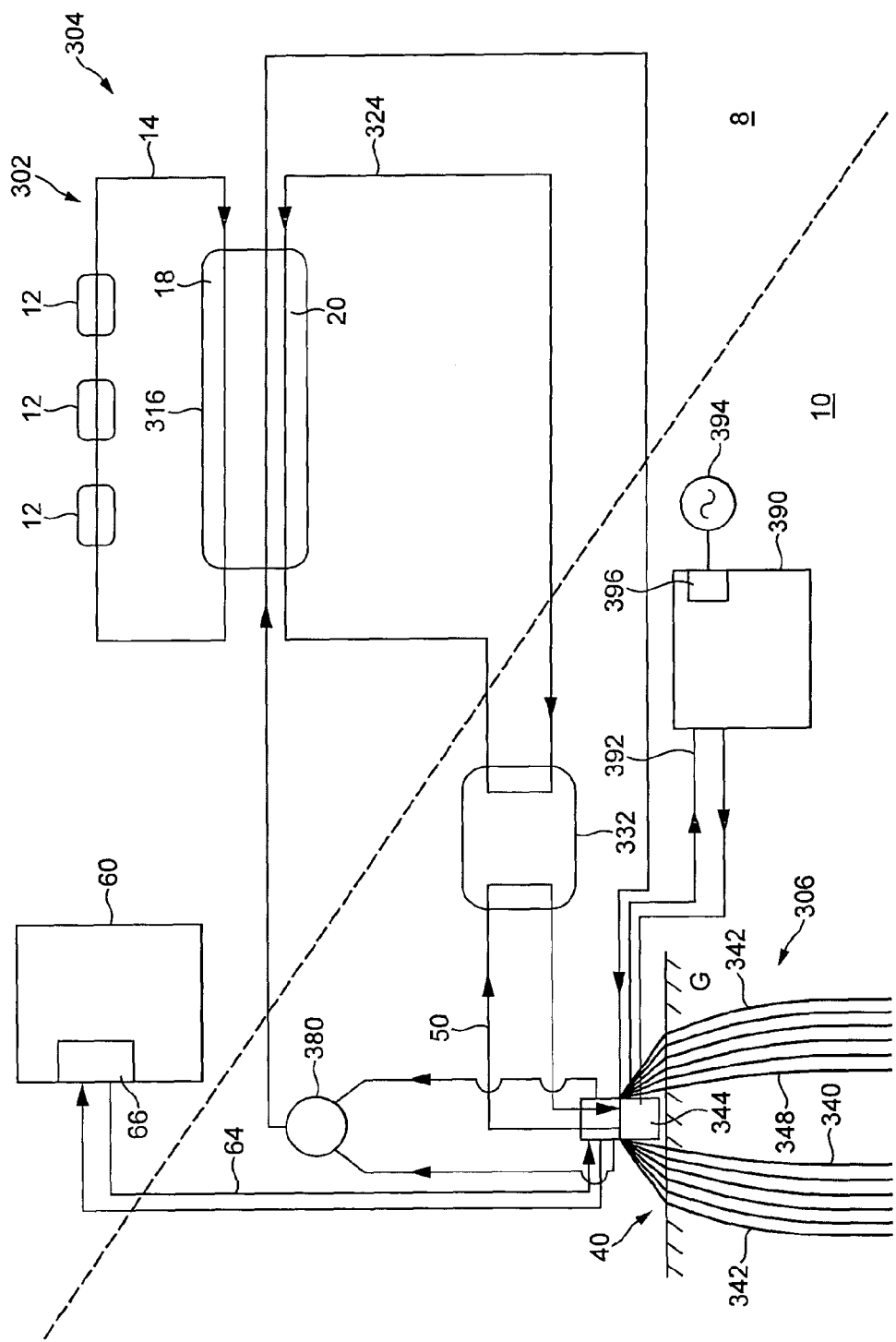
FIG. 4 is a schematic diagram of a thermal energy system including a refrigeration system of a supermarket coupled to a closed loop geothermal energy system in accordance with a fourth embodiment of the present invention.

Referring to FIG. 4, there is shown schematically a refrigeration system 302 of a supermarket 304 coupled to a closed loop geothermal energy system 306 in accordance with a fourth embodiment of the present invention, which is a modification of the third embodiment.

In this embodiment, as for the previous embodiment, excess cooling of the resting group (or bank) 346 of BHEs 342 is employed so that in the resting phase, the temperature of the working fluid is overcooled as compared to the desired temperature for the subsequent working (cooling) phase. When the working fluid is aqueous and includes a glycol, such as ethylene glycol, this can cause the formation of an ice slurry as the overcooled working fluid.

The overcooling can be achieved even in summer months by providing an additional heat exchanger 390 coupled to the manifold 344 in a further heat exchanger loop 392. The pump 396 of the heat exchanger 390 is connected to a source 394 of electrical power. During the night time, when the electrical power is commercially available on a cheaper night-tariff, the pump 396 is drive to force circulation of working fluid into a resting group or bank of BHEs 342. This extracts heat from the resting bank of BHEs 342 which is exhausted to the atmosphere, and cools down the resting bank of BHEs 342. As for the previous embodiment, the excessively cooled working fluid from the resting group or bank of BHEs 342 can subsequently be used to constitute a low temperature feed to the thermostatic mixing valve 380.

Figure 5:
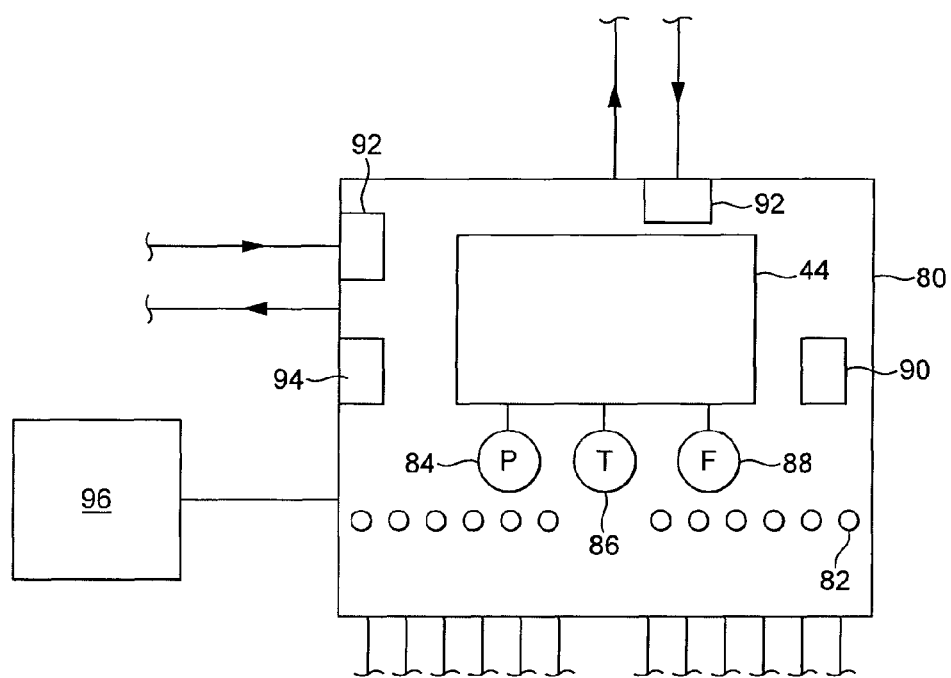
FIG. 5 is a schematic diagram of control system for the thermal energy recovery system of the embodiments of FIGS. 1 to 4.

In the embodiments of the present invention, the flow rates and temperatures in the various loops are monitored and regulated in order to maximise overall performance and thereby meet the varying energy demands of the refrigeration system, and when present the HVAC system, without constraint. This is done by means of a surface control module 80 (SCM), shown in FIG. 5, which incorporates the common manifold unit 44. In the case where more than one array 40 is installed, there may more than one surface control module 80 depending upon the overall design requirements.

The surface control module 80 incorporates, as part of or connected to the central manifold unit 44, valves 82, pressure gauges 84, temperature sensors 86 and flow sensors 88 which are controlled by a microprocessor 90 programmed to maintain the optimum energy balance of the array 40 of borehole heat exchangers 2 and to deliver working fluid at the required temperature to the heat pump 32 and the HVAC system 60. One or more pumps 92 is provided for pumping the working fluid through the array 40 of borehole heat exchangers 42. In addition, the thermal energy delivered to the HVAC system 60 may be metered by a meter 94 at the output of the surface control module 80. Software is installed in the microprocessor 90 which maps the response of the array 40 to varying building energy demand and which is compatible with the building management system 96. This software may be modified and re-installed should the demand profile change or in order to implement upgrades.

The manifold 44 is connected to the array 40 of borehole heat exchangers 2 by a network of pre-insulated thermoplastic pipes that are typically buried 1-2 meters below ground level and which ensure minimum thermal and hydraulic energy losses during the transfer process.

The surface control module (SCM) intrinsic to the manifold contains a programmable computer module, sensors and control valves to monitor and control all working fluid flow rates, flow directions, temperatures and pressures for each borehole heat exchanger as well as throughout the complete system including for the monitoring and control of the primary working fluid inlet and outlet flows from the surface control module to the serviced building.

Optionally, temperature sensors attached to the borehole heat exchanger at various intervals along the length of the borehole heat exchanger may be used to supplement the monitoring and control of the borehole heat exchanger thermal response curve.

The boreholes are typically drilled using a customised, automated mobile drilling rig which may be equipped with a slant drilling capability. This is operated in conjunction with established equipment and techniques sourced from the oil and gas industry such as measurement-while-drilling sondes (MWD), steerable hydraulic motors and/or steerable rotary drilling systems, downhole hydraulic motors, directional air hammers, gyroscopic and inertial guidance systems and associated control software so as to drill an array of boreholes starting from a concrete pad a few meters square in area within which the wellheads will be spaced 3 meters or less at surface but which may be drilled directionally to achieve wide separation of up to hundreds of meters at the final depth. The drilling process may be facilitated by the use of non-toxic "drilling fluids" including water-based fluids, foam or air depending upon the application.

Each borehole heat exchanger may consist of a co-axial "tube-in-tube" arrangement which is mechanically and hydraulically isolated from the ground formations traversed by the containing borehole. The outer casing may be constructed from steel, aluminium, polyvinyl chloride (PVC), glass reinforced plastic (GRP) or carbon reinforced plastic (CRP) according to the application. The outer casing may be cemented partially, wholly or not at all within the containing borehole depending upon the nature of the ground formations being traversed. The cement formulation may include traditional cement-based grouting or alternatively swellable sealing compounds according to the application.

Within the outer casing is installed a thick-walled or pre-insulated tubing made of PVC, GRP or CRP composite material or alternatively steel or aluminium encased in an insulating sleeve. According to type and application, this tubing may be delivered and installed as a continuous coil or in discrete lengths that are then mechanically joined together. This tubing is centralised in the bore of the outer casing by angled centralising "deflectors" that provide the necessary cross-sectional area clearance between the outer casing and the inner tubing as well as providing improved heat transfer from the outer casing to the working fluid by the resultant "swirling" action.

The working fluid path is confined within the borehole heat exchanger by a mechanical plug which is permanently installed at the bottom of the outer casing such that closed-circuit flow is established either down the annulus between the outer casing and inner tubing and up the inner tubing (reverse circulation) or vice-versa (forward circulation). This closed-circuit method ensures that the working fluid at no time in operation comes into contact with ground formations or associated liquid accumulations, typically aquifers thus making the system environmentally friendly.

The present inventors, following further studies of deep thermosyphonic activity based upon a computer model, came to the realisation that commercial sized building power requirements for cooling were significantly larger than for heating in the UK environment, particularly for supermarkets which have significant in-store refrigeration systems that can generate large amounts of excess heat. The conclusion drawn from this was that heat rejection into the ground was at least as important as heat extraction in satisfying a buildings' space heating and cooling requirements, particularly applications for space heating and cooling for commercial sized buildings. There are increasing international concerns with global warming and in particular as regards emissions of greenhouse gases such as carbon dioxide generated by human activity. Geothermal energy, either for the purposes of space heating and/or cooling or for the generation of electric power, offers a renewable, low carbon alternative to fossil fuelled energy systems.

In some embodiments the boreholes in which the coaxial borehole heat exchangers are installed are directionally drilled so as to maintain sufficient length of borehole heat exchangers while keeping the overall depth minimised. This may be achieved by selection of a suitable trajectory for the borehole from vertical, through inclined, to horizontal according to the application.

In the preferred embodiments of the present invention, there is the concept of directional drilling of the borehole heat exchangers using oil and gas drilling practice by drilling an "array" of boreholes of varying trajectory from a small concrete "pad" at the ground surface within which the surface terminations ("Wellheads") of the boreholes are closely spaced, usually only by a distance of three meters or less. The drilling may be performed by a conventional, lightweight mobile rig. This is in direct contrast to the current standard practice of either drilling tens or hundreds of shallow (e.g. 100 m) boreholes ("U-tubes") or installing kilometers of plastic piping in shallow (2 m) trenches ("Slinkies") over hundreds of square meters. The cost, inconvenience and reduction of useable land area caused by the current practice, has acted as a barrier to the growth of geothermal energy applications in the UK in particular. In contrast, the pad drilling approach has many advantages including a small surface footprint of a 10-20 square meters as well as the capability to install long lengths of borehole with no disturbance of the adjacent site surface.

A study was made of a generic office building (in the UK) whereby the building heating and cooling energy profile would be matched to an array of borehole heat exchangers capable of providing both heating and cooling energy. These studies confirmed the dominance of cooling energy requirement over heating energy requirement.

In the preferred embodiments of the present invention, the surface connections of each borehole heat exchanger are assembled together in an array having a small footprint together by a surface control module that contains the necessary valves and sensors that enable computer control of the flow conditions through each borehole heat exchanger, between each borehole heat exchanger, and between the borehole heat exchanger array and the building(s) served. This can not only optimise the energy balance of the whole array but would also lead to sustaining varying loads from the building without depleting or saturating the ground thermal environment. Furthermore, the surface control unit would enable the simultaneous supply of heating and cooling energy to the served building(s).

Computer modelling has demonstrated the response of a range of different borehole heat exchangers over different flow rate and operating temperature ranges. The results confirmed that the expected impacts of depth, trajectory, borehole heat exchanger diameter, flow rate, flow direction, ground temperature, casing and tubing materials and mode of operation were as expected. Also important was the revelation that by altering the on-off cycling periods of circulation, higher efficiency and peak power outputs could be realised, this enhancing the compatibility of the borehole heat exchangers to the building energy demand profile. Furthermore, it was noted that under certain conditions, the low carbon emissions performance of the borehole heat exchanger array could be enhanced and the versatility of the array increased by combining it with other renewable technologies, such as combined heat and power (CHP) to deal more effectively with peak power demands and to further reduce the carbon footprint of the installation.

By design, the borehole heat exchanger array thermal power output curves are matched to the building thermal power demand curves re space heating, cooling and hot water supply.

In accordance with preferred aspects of the invention, the thermal energy management of individual buildings to can be extended to the thermal energy management of multiple buildings and facilities and to the incorporation of a variety of thermal sources and storage resources. The surface control module is a central component of such a multiple-component system.

Energy efficiency is a contributor to the reduction of global carbon dioxide emissions. The present invention can provide large scale, high efficiency space heating and cooling installations based upon existing and well proven ground source heat pump practice.

The borehole heat exchangers can be installed by the adaptation of advanced, technically and commercially proven oilfield wellbore drilling and completion technologies that have been employed both onshore and offshore for many years. The principal advantage is to cost-effectively construct an array of boreholes that will be completed with a highly efficient co-axial, closed loop heat exchanger design that will serve a matched building services design from a small location or pad adjacent to the relevant building.

The geothermal energy system of the preferred embodiments of the present invention is an integrated, customised, energy-efficient and low-carbon emission system that provides space heating and/or cooling energy principally to large-scale building structures or any building with a high demand in heating and/or cooling. The energy provided by geothermal energy system is derived largely from globally abundant, low temperature geothermal sources that are both sustainable and renewable and provide the means to achieve very significant reductions in the carbon footprint of the serviced buildings.

There is also provided, in the preferred embodiments of the present invention, a highly efficient and practical geothermal borehole heat exchanger array coupled to a surface control module and energy delivery network capable of delivering or storing large quantities of thermal energy in combination with the most advanced ground source heat pump technology and best practice in design methods and materials in the building services industry.

The preferred embodiments of the present invention can provide a compact array of borehole heat exchangers consisting of multiple, directionally drilled and specially equipped geothermal boreholes, specifically designed for maximum efficiency under the thermal loads envisaged and for precise matching to the building services design. The preferred embodiments of the present invention can provide a microprocessor surface control module "SCM" interface unit that manages the transfer of geothermal energy to or from the building services installation and between the individual borehole heat exchangers in the array.

The preferred embodiments of the present invention can provide a low pressure, thermally insulated, energy distribution network linking the SCM to the building services installation.

The preferred embodiments of the present invention can provide a purpose designed and constructed building services installation, incorporating advanced heat pump technology for heating and/or cooling of treated areas and provision of hot water within the building.

One or more separate arrays may be installed at a given site depending upon the size of the development and the energy demand profile.

An important consideration in the design of a geothermal energy system installation is the balance of demand from the building services installation between heating and cooling, which has a direct influence on whether the borehole heat exchangers are constructed vertically, inclined or even horizontally under the permitted area of the property development. If heating is the primary consideration, then a vertical borehole heat exchanger would be prescribed. Conversely, if cooling is the primary consideration, then a horizontal borehole heat exchanger would deliver the optimum performance. In practice, the geothermal energy system installation of the present invention would typically include numbers of vertical, inclined and horizontal borehole heat exchangers drilled from one or more pads from which the borehole heat exchangers would be constructed in a pattern akin to the root system of a tree but which in this case is designed to harvest or store thermal energy in the ground formations penetrated.

Furthermore, it is of importance to integrate the design of the borehole heat exchanger array with the building services design and its energy profile, to avoid the inefficiencies that have typically resulted from mismatched equipment in the past when ground source heat pump installations have been prescribed. The objective is to leverage off the respective technologies employed by ensuring that, as far as possible, the technology employed in the building services installation is matched to the performance capabilities of the borehole heat exchanger array as well as providing the most efficient performance in delivering heating and cooling to the building services design.

In accordance with preferred embodiments of the present invention therefore, a compact surface pad is provided to extend the coaxial borehole heat exchangers beyond the surface boundaries of the pad. Directional drilling techniques, typically found in oil and gas field development practice, are employed as a practical solution to install the coaxial borehole heat exchangers, and to install each coaxial borehole heat exchanger to the required degree of depth, angle and azimuth. The installed coaxial borehole heat exchangers can be free of thermal interference factor, except typically for the topmost 20-30 meters of the coaxial borehole heat exchangers, which is typically less than 5% of the total length for each BHE, and also less than the total length of each cluster of coaxial borehole heat exchangers. By providing a three dimensional array, multiple heat transfer processes throughout a large volume can be achieved from one point, the pad, at the ground surface. This may be contrasted with a single dimension heat transfer process for known vertical borehole heat exchangers. By providing a pad, there is no need for an extensive collector system at the ground surface, and this achieves an ultra high density output/input of thermal energy per surface pad. The pad can be located next to a building or directly under the utility room or any other part of a building in the case of a newly constructed building. There are only limited or even substantially no operating losses as a result of the distance between the borehole heat exchangers and the building. By providing multiple depth borehole heat exchangers any or all of heating, hot water services and/or simultaneous cooling can be provided from a single pad and surface control module, or one operating mode can be selected. The coaxial borehole heat exchangers of the array can be managed collectively or independently. It is possible to provide re-circulation of working fluid between the borehole heat exchangers of the array to re-charge or release excessive thermal energy to provide ideal temperature gradient/s for each type of heating or cooling operation.

The directional drilling provides an option to choose selected trajectory (ies) and depth(s) to locate each coaxial borehole heat exchangers within a rock formation having a quality providing the best thermal conductivity for effective harvesting or injection of thermal energy. The directional drilling can utilise rock fraction orientation to reduce the drilling cost or to improve thermal energy transfer. It is possible to maximise the aquifer flow effect using a close borehole heat exchanger without impact on natural resources.

Furthermore, it is possible to go around or indeed through a borehole heat exchanger array of a neighbouring building at a safe distance without causing thermal interference.

An extended coaxial borehole heat exchanger array can have a geometry that allows effective use of internal thermosyphonic flows within one or more closed circuits between one or plural borehole heat exchangers for re-distribution of heat energy along the length of one, or several, or all borehole heat exchangers located at one pad. This can save running costs related to circulation energy losses, by lowering the pumping demand, and can lower the thermal energy required by the heat pump plant.

The use of thermosyphonic circular flow, that is buoyancy flow driven by changes in the working fluid density affected by a thermal energy temperature gradient, is known for borehole heat exchangers. However, for a number of reasons, including the limitation of extensive surface collector systems, there was a barrier against the use of complex interacting flows between separate but connected ground heat exchangers located to different depths and temperature gradients under controlled trajectories. However, the system of the preferred embodiments of the present invention is capable of effective utilisation of these flows as a system or in a single vertical, directional or horizontal (e.g. L shaped) borehole heat exchanger.

The preferred embodiments of the present invention provide an apparatus for extracting or injection of a large amount thermal energy from a single compact pad or multiple compact pads in which an array of borehole heat exchanger, which are preferably coaxial, extend beyond the ground surface point to serve heat pump plants of industrial size and capacity. There can be provided an apparatus for the management of an array of borehole heat exchangers as one unit, or as individual units in individual modes, or in any proportion between the whole array or one single borehole heat exchanger via a head control unit, consisting of a series of valves and gauges within a compact manifold unit. The user interface can be attached to the head control unit of an array, or detached from but linked to a head control unit of an array for operation from adjacent building. By utilising the 3D volume of strata under a predetermined area defined by surface boundaries, a heat energy sink or source or store can be provided in abundance, and having a capability to match any given consumer requirements of the building. The array can comprise a plurality of directionally drilled borehole heat exchangers, each of a prescribed depth, angle and azimuth. The system can have a single or multiple compact pads in different forms of clusters e.g. circular, rectangular, arc, square and straight line or any combination of these forms for adjacent clusters. The array can have a combination of multiple or single directional, horizontal and vertical coaxial borehole heat exchangers within single or multiple arrays. The pad constitutes a compact collector system allowing transmission of high density thermal energy per unit of surface space, thereby reducing working fluid pressure and thermal losses. The surface location of the pad is adjacent to or remote from the building or facility, or located under any part of the building or facility, with the borehole heat exchanger array spread beyond such surface location to any side or depth. Multiple borehole heat exchangers can be used in different modes depending on the season, climate and the building's energy profile. The system is capable of supplying, absorbing or storing thermal energy at different depths or causing forced re-circulation between multiple depths and/or external thermal gradients. Additionally, the system can re-distribute thermal energy between parts of an array by means of thermosyphonic flows to improve an uptake efficiency by the heat pump plant. The directional drilling is capable of full utilisation of selected horizons consisting of preferable quality rock strata by following a given pattern of the rock formations, full utilisation of aquifer flows by following a given pattern of aquifers, and sinking a horizontal part of the closed circuit borehole heat exchanger to gain or reject thermal energy at premium rates, and also full utilisation of rock fracture orientation through following or crossing a given pattern of fractures to achieve premium rates in thermal conductivity. The laying of an array of borehole heat exchangers upon individual strata settings can be carried out to achieve optimum thermal efficiency for the given ground volume. By operating with a selected number of borehole heat exchangers based on a current thermal gradient, this permits switching off of the rest of an array from forced circulation, with an option for passive redistribution of thermal energy between selected stand-by borehole heat exchangers.

The key to the cost-effective installation of the borehole heat exchanger array is the concept of combining advanced oil and gas drilling and completion technologies and adapting them to the shallower environment typical of geothermal exploitation. A combination of this technology and associated techniques with materials specified precisely to match the relatively benign geological environment allows construction of multiple boreholes along any desired trajectory and to the prescribed depth, from a compact surface location in an entirely self-contained manner. This is a key advantage when considering projects in the urban environment or where surface area is limited.

The embodiments of the present invention described herein are purely illustrative and do not limit the scope of the claims. Features disclosed with respect to one embodiment may be combined with features of any other embodiment and be within the scope of the invention claimed.

The invention claimed is:

1. A thermal energy system comprising:
a first thermal system;
a closed loop geothermal energy system comprising a plurality of borehole heat exchangers containing a working fluid;
a manifold for the working fluid to which the plurality of borehole heat exchangers is connected, and a plurality of valves connected between the plurality of borehole heat exchangers and the manifold, whereby each of the plurality of borehole heat exchangers is selectively fluidly connectable to the manifold by operation of the valves;
an intermediate heat pump thermally connected between the first thermal system and the geothermal energy system, wherein the closed loop geothermal energy system comprises first and second groups of borehole heat exchangers, each group of borehole heat exchangers being selectively and alternately connectable to the intermediate heat pump,
the first thermal system comprising:
a refrigeration system in a building, and
at least one heat exchanger coupled to a condenser of the refrigeration system to recover thermal energy from the refrigeration system and coupled to the intermediate heat pump;
a second thermal system, the second thermal system being thermally connected to the geothermal energy system;
an automatic control system operating the valves and configured to automatically fluidly connect the intermediate heat pump selectively and alternately to each one of the first and second groups of borehole heat exchangers in a succession of alternating cycles using the plurality of valves; and
wherein the first and second thermal systems respectively have opposite net thermal energy demands from the geothermal energy system.

2. The thermal energy system according to claim 1 wherein each borehole heat exchanger comprises an elongate tube having a first end and a second end, the second end closed off.

3. The thermal energy system according to claim 1 wherein the automatic control system selectively and alternately automatically fluidly connects the second thermal system to each one of the first and second groups of borehole heat exchangers in a succession of alternating cycles.

4. The thermal energy system according to claim 1 wherein the heat pump is thermally connected between the first thermal system and the geothermal energy system by a first heat exchange loop between the intermediate heat pump and the heat exchanger system and a second heat exchange loop between the heat pump and the geothermal energy system.

5. The thermal energy system according to claim 1 wherein the plurality of borehole heat exchangers further comprises first and second conduits selectively fluidly connectable to the manifold by operation of the valves whereby each group of borehole heat exchangers can be operated to provide flow of the working fluid therethrough in a selected direction.

6. The thermal energy system according to claim 5 wherein the valves are arranged to permit selective passing of the working fluid through a selected group of the borehole heat exchangers in a respective selected direction with respect to the respective first and second conduits of the respective borehole heat exchanger.

7. The thermal energy system according to claim 1 wherein the plurality of borehole heat exchangers extends downwardly and laterally into the ground from a central surface assembly of the elongate tubes to define a ground volume of the geothermal energy system which encloses the plurality of borehole heat exchangers, and wherein a footprint area of the central surface assembly is less than 10% of a footprint area of the ground volume of the geothermal energy system.

8. The thermal energy system according to claim 1 further comprising a control module connected to the plurality of borehole heat exchangers for controlling the valves for selectively distributing the working fluid within the plurality of borehole heat exchangers to achieve a particular thermal energy profile for the geothermal energy system, and the control module is adapted to control the thermal energy supply to or from at least the first thermal system.

9. The thermal energy system according to claim 1 wherein the geothermal energy system and the intermediate heat pump are exterior of a building containing at least the first thermal system.

10. The thermal energy system according to claim 1 further comprising a conduit loop for the working fluid extending from the geothermal energy system to the first thermal system which bypasses the intermediate heat pump.

11. The thermal energy system according to claim 8 wherein the conduit loop comprises first and second inlet conduits extending respectively from the first and second groups of borehole heat exchangers to a common thermostatic mixing valve and an outlet conduit extends from the thermostatic mixing valve, through the first thermal system and back to the borehole heat exchangers.

12. The thermal energy system according to claim 1 further comprising a heat exchanger cooling loop connected to the geothermal energy system, the heat exchanger cooling loop being adapted selectively to cause cooling of the working fluid within selected borehole heat exchangers.

13. The thermal energy system according to claim 12 wherein the heat exchanger cooling loop is controlled by a timer which permits operation of the heat exchanger cooling loop during a selected time period.

14. The thermal energy system according to claim 12 wherein the heat exchanger cooling loop is adapted to expel excess heat therefrom to the atmosphere.

* * * * *